I

US009836415B2

(12) United States Patent
Shan et al.

(10) Patent No.: US 9,836,415 B2
(45) Date of Patent: Dec. 5, 2017

(54) BUFFER DEVICE, METHOD AND APPARATUS FOR CONTROLLING ACCESS TO INTERNAL MEMORY

(71) Applicant: MONTAGE TECHNOLOGY (SHANGHAI) CO., LTD., Shanghai (CN)

(72) Inventors: Gang Shan, Shanghai (CN); Chonghe Yang, Shanghai (CN)

(73) Assignee: MONTAGE TECHNOLOGY (SHANGHAI) CO., LTD., Shanghai (CN)

( * ) Notice: Subject to any disclaimer, the term of this patent is extended or adjusted under 35 U.S.C. 154(b) by 31 days.

(21) Appl. No.: 14/727,876

(22) Filed: Jun. 2, 2015

(65) Prior Publication Data

US 2016/0217086 A1    Jul. 28, 2016

(30) Foreign Application Priority Data

Jan. 23, 2015    (CN) .......................... 2015 1 0035868

(51) Int. Cl.
| | |
|---|---|
| *G06F 3/00* | (2006.01) |
| *G06F 5/00* | (2006.01) |
| *G06F 13/16* | (2006.01) |
| *G11C 11/4093* | (2006.01) |
| *G06F 21/62* | (2013.01) |
| *G06F 5/10* | (2006.01) |
| *G11C 7/10* | (2006.01) |

(Continued)

(52) U.S. Cl.
CPC ............ *G06F 13/1673* (2013.01); *G06F 5/10* (2013.01); *G06F 21/6218* (2013.01); *G06F 21/79* (2013.01); *G11C 7/10* (2013.01); *G11C 7/24* (2013.01); *G11C 11/4093* (2013.01); *G06F 2205/066* (2013.01)

(58) Field of Classification Search
None
See application file for complete search history.

(56) References Cited

U.S. PATENT DOCUMENTS 7,457,171 B2 * 11/2008 Richter ................ G11C 7/1006
365/189.05
2009/0271583 A1 * 10/2009 Kershaw ................ G06F 21/52
711/163

(Continued)

*Primary Examiner* — David E Martinez
(74) *Attorney, Agent, or Firm* — Jun He Law Offices P.C.; James J. Zhu

(57) ABSTRACT

The application discloses a buffer device and a method for controlling data access to an internal memory. The buffer device has a central buffer module coupled to a memory interface to receive a command/address signal via a command/address channel. The central buffer module is configured to detect whether a destination address of the received command/address signal is within a predefined address space, and generate a security read/write signal when the command/address signal is within the predefined address space. The buffer device further has a data buffer module coupled between the memory interface and a memory module to buffer data therebetween. The data buffer module is configured to store reference data, compare the buffered data with the reference data in response to the security read/write signal, and determine whether or not to restrict exchange of the buffered data between the memory module and the memory interface.

39 Claims, 4 Drawing Sheets

(51) Int. Cl.
*G11C 7/24* (2006.01)
*G06F 21/79* (2013.01)

(56) References Cited

U.S. PATENT DOCUMENTS

2014/0053248 A1* 2/2014 Hulusi .................... H04L 63/08
726/4
2015/0220707 A1* 8/2015 Kline ...................... G06F 21/10
726/30

* cited by examiner

BUFFER DEVICE, METHOD AND APPARATUS FOR CONTROLLING ACCESS TO INTERNAL MEMORY

CROSS REFERENCE TO RELATED APPLICATIONS

This application claims priority to Chinese Patent Application Number 201510035868.X filed on Jan. 23, 2015, the entire content of which is incorporated herein by reference.

TECHNICAL FIELD

The application generally relates to memory technology, and more particular to a buffer device having data access control function and a method and apparatus for controlling access to an internal memory.

BACKGROUND

Rapid development of internet technology enables the interconnection and communication of network devices such as computers, mobile terminals, etc. People can easily obtain information through the interconnected devices. Consequently, data and information security problem becomes more and more important. The interconnected devices may be easily attacked by external unauthorized devices, either accidentally or maliciously, thereby causing damage, disclosure or tampering of internal data.

Thus, there is a need to improve conventional computers or other electronic devices to improve their data security.

SUMMARY

One objective of the application is to improve conventional computers or electronic devices to improve their data security and system stability.

In a first aspect of the application, there is provided a buffer device. The buffer device comprises a central buffer module coupled to a memory interface to receive a command/address signal via a command/address channel, the central buffer module being configured to detect whether a destination address of the received command/address signal is within a predefined address space, and generate a security read/write signal when the command/address signal is within the predefined address space; and a data buffer module coupled between the memory interface and a memory module to buffer data therebetween, the data buffer module being configured to store reference data, compare the buffered data with the reference data in response to the security read/write signal, and determine whether or not to restrict exchange of the buffered data between the memory module and the memory interface.

In some embodiments, the central buffer module is further configured to store the reference data and control transferring of the reference data to the data buffer module.

In some embodiments, the data buffer comprises at least one group of data buffering units, each group of data buffering units being configured to buffer a portion of the buffered data and a portion of the reference data, and compare the portion of the buffered data with the portion of the reference data.

In some embodiments, the data buffer module is configured to restrict the exchange of the buffered data between the memory module and the memory interface when the buffered data is different from the reference data, and not to restrict the exchange of the buffered data between the memory module and the memory interface when the buffered data is the same as the reference data.

In some embodiments, the data buffer module restricting the exchange of the buffered data between the memory module and the memory interface comprises: the data buffer module being configured not to provide the buffered data to the memory interface or the memory module; or the data buffer module being configured to replace the buffered data with replacement data and provide the replacement data to the memory interface or the memory module.

In some embodiments, the central buffer module is configured to generate a normal read/write signal when the destination address of the command/address signal is not within the predefined address space; and the data buffer module is configured not to compare the buffered data with the reference data and to perform a normal read/write operation in response to the normal read/write signal.

In some embodiments, the central buffer module comprises a data access interface through which the reference data and/or the predefined address space is written into the central buffer module.

In some embodiments, the data access interface is an encrypted interface which is configured to allow only an authorized user or device to access the data in the central buffer module.

In some embodiments, the predefined address space corresponds to a region for storing instructions in the memory module.

In some embodiments, the memory module and the memory interface is in accordance with the JEDEC DDR SDRAM standard.

In some embodiments, the central buffer module is integrated in a registering clock driver and the registering clock driver is configured to provide the security read/write signal to the data buffer module via a data buffer control bus.

In some embodiments, the registering clock driver is further configured to write the reference data into the data buffer module via the data buffer control bus.

In some embodiments, the buffer device further comprises a logger coupled to the central buffer module and for obtaining and logging a history of the read/write operations to the buffer device.

In some embodiments, the central buffer module and the data buffer module are integrated in a single chip or separated in different chips.

In some embodiments, the buffer device and the memory module are integrated on a single board.

In some embodiments, the memory module comprises a volatile memory, a non-volatile memory or a combination thereof.

In another aspect of the application, there is provided an internal memory comprising the buffer devices of the aspect described above. Furthermore, the internal memory may be comprised within a computer system, a mobile terminal or other electronic devices.

In another aspect of the application, there is also provided an apparatus for controlling data access to an internal memory. The apparatus comprises a controller coupled to a central processing unit to receive a data access signal; the data access signal containing a data access command and a destination address corresponding to a destination storage location in a memory module of the internal memory; the controller being configured to detect whether the destination address is within a predefined address space and generate a security access signal when the destination address is within the predefined address space; and a data interface coupled between the central processing unit and the memory module of the internal memory and coupled to the controller to exchange data between the central processing unit and the memory module of the internal memory under the control of the controller; the data interface being configured, in response to the security access signal, to obtain data to be exchanged from one of the central processing unit and the memory module of the internal memory, compare the data to be exchanged with reference data, and determine whether or not to restrict transferring of the data to be exchanged to the other of the central processing unit and the memory module of the internal memory.

In some embodiments, the data interface comprises a reference data storage module for storing the reference data; a data buffer module coupled between the central processing unit and the memory module of the internal memory and for buffering the data to be exchanged; and a data comparison module for comparing the reference data with the data to be exchanged.

In some embodiments, the data interface is configured to restrict transferring of the data to be exchanged to the other of the central processing unit and the memory module of the internal memory when the data to be exchanged is different from the reference data, and not to restrict transferring of the data to be exchanged when the data to be exchanged is the same as the reference data.

In some embodiments, the data interface restricting transferring of the data to be exchanged comprises: the data interface being configured not to provide the data to be exchanged to the other of the central processing unit and the memory module of the internal memory; or the data interface being configured to replace the data to be exchanged with replacement data and provide the replacement data to the other of the central processing unit and the memory module of the internal memory.

In some embodiments, the controller is configured to generate a normal access signal when the destination address is not within the predefined address space; and the data interface is configured not to compare the data to be exchanged with the reference data and to perform a normal access operation in response to the normal access signal.

In some embodiments, the predefined address space corresponds to a region for storing instructions in the memory module.

In some embodiments, the controller comprises a data access interface through which the reference data and/or the predefined address space are written into the central buffer module.

In some embodiments, the data access interface is an encrypted interface which is configured to allow only an authorized user or device to access the data in the controller module.

In some embodiments, the internal memory is in accordance with the JEDEC DDR SDRAM standard.

In some embodiments, the apparatus further comprises a logger coupled to the controller for obtaining and logging a history of the security access operations to the apparatus.

In another aspect of the application, there is provided an internal memory comprising the apparatus for controlling data access of the internal memory of the aspect described above. The internal memory can be comprised within a computer system or a mobile terminal.

In another aspect of the application, there is provided a method for controlling data access to an internal memory. The method comprises receiving a data access signal; the data access signal containing a data access command and a destination address corresponding to a destination storage location in a memory module of the internal memory; detecting whether the destination address is within a predefined address space, and generating a security access signal when the destination address is within the predefined address space; obtaining data to be exchanged from one of a central processing unit and the memory module of the internal memory and comparing the data to be exchanged with reference data in response of the security access signal; and determining whether or not to restrict transferring of the data to be exchanged to the other of the central processing unit and the memory module of the internal memory.

In applications, the apparatus and method for controlling data access to the internal memory prevent unauthorized access to the internal memory by employing a security read/write operation mechanism, thereby effectively solving the data divulgation problem. For example, the reference data may be a set of instructions permitted to access the internal memory. During the security read/write operation, if a buffered instruction or data is the same as the reference data, it is indicated that the buffered instruction is an authorized instruction. In this case, the central processing unit is allowed to call or access the authorized instruction. However, if the buffered instruction or data is not an authorized instruction, e.g. a "back-door" instruction unknown to the system, then the central processing unit can not call or access the unauthorized instruction, i.e., can not execute the instruction. In this way, the unknown risk of executing the instruction can be avoided so that the security of the computer system can be improved.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the application. It should be understood that, the various aspects of the application described and graphically presented herein may be arranged, replaced, combined, divided and designed in many different configurations, and these different configurations are implicitly included in the application.

Figure 1:
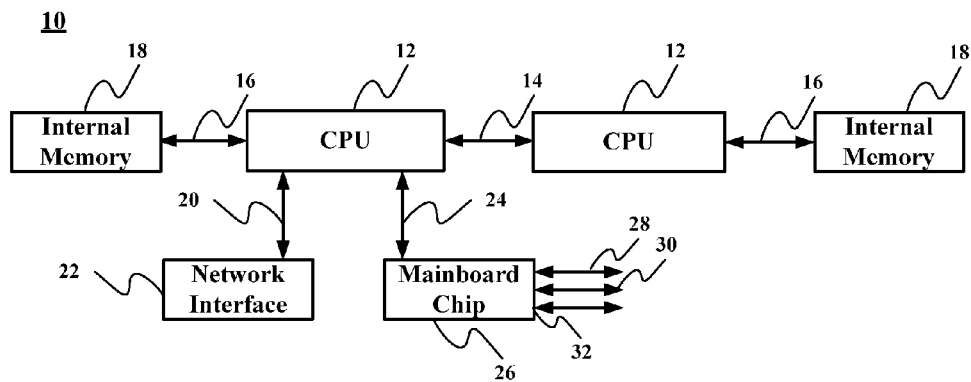
FIG. 1 shows a block diagram of a conventional server.

The inventors of the application have found that a memory interface is the key interface of a system schematic for a computer system, a mobile terminal or other smart electronic devices. FIG. 1 shows a block diagram of a conventional computer system. As shown in FIG. 1, the computer system 10 (e.g., a server) has two central processing unit (CPU) 12 that communicate with each other via a QPI bus 14. Each CPU 12 is coupled to an internal memory 18 via a memory interface 16 (e.g., the DDR3, DDR4, etc. interface), coupled to a network interface 22 via a PCIE interface 20 (further to the Internet), and coupled to a mainboard chip 26 via a DMI interface 24. The mainboard chip 26 also has other interfaces such as SAS interface 28, SATA interface 30, and USB interface 32 to couple with low-speed components (not shown in FIG. 1).

During the normal operation of the computer system 10, instructions and non-instruction data on which the running of programs depends is stored in the internal memory 18. Thus, data transferring performed in the computer system 10 generally requires the CPU 12 to access the internal memory 18 via the memory interface 16. The inventors have found that an access control mechanism can be configured in the memory interface 16 to restrict the data access to the internal memory 18 of data access commands from the CPU 12, thereby avoiding unauthorized invocation or modification to data stored within the internal memory 18. In some embodiments of the application, a new access control mechanism is configured in a buffer device of the memory interface 16.

Figure 2:
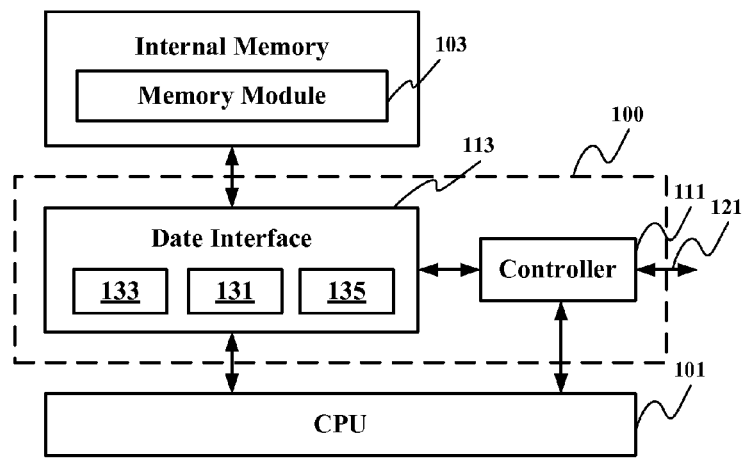
FIG. 2 shows an apparatus 100 for controlling data access to an internal memory according to an embodiment of the application.

FIG. 2 shows an apparatus 100 for controlling data access to an internal memory according to an embodiment of the application. The apparatus 100 may be coupled between a CPU 101 and a memory module 103 of an internal memory to exchange data therebetween. The internal memory can be an internal memory in accordance with the JEDEC Double Data Rate (DDR) Synchronous Dynamic Random Access Memory (SDRAM) standard, including the JEDEC DDR1, DDR2, DDR3, DDR4 and other DDR standards. Moreover, the internal memory can be an internal memory in accordance with other standards or protocols, e.g. a SDRAM or RAMBUS internal memory. In some embodiments, the memory module 103 of the internal memory may include a volatile memory (e.g., RAM), a non-volatile memory (e.g., flash memory) or a combination thereof. It should be noted that the memory module herein may include a single memory chip or two or more memory chips.

As shown in FIG. 2, the apparatus 100 includes a controller 111 coupled to the CPU 101 to receive a data access signal. The data access signal contains a data access command and a destination address corresponding to a destination storage location in the memory module 103 of the internal memory. The controller 111 detects whether the destination address is within a predefined address space, and generates a security access signal when the destination address is within the predefined address space. The generation of the security access signal indicates that it is necessary to carry out a security check on the data access to determine whether it would place data security at risk. In some embodiments, the controller 111 generates a normal access signal when the destination address is not within the predefined address space. The normal access signal is a signal used to instruct the internal memory to perform a read, write or other operations as usual. The generation of the normal access signal indicates that it is unnecessary to carry out the security check on the data access.

The apparatus 100 further includes a data interface 113 coupled between the CPU 101 and the memory module 103 of the internal memory and coupled to the controller 111 to exchange data between the CPU 101 and the memory module of the internal memory under the control of the controller 111. For example, the data write operation indicates to transfer data from the CPU 101 to the memory module 103 of the internal memory via the data interface 113, and the data read operation indicates to transfer data from the memory module 103 of the internal memory to the CPU 101 via the data interface 113.

In response to the security access signal, the data interface 113 obtains data to be exchanged from one of the CPU 101 and the memory module 103 of the internal memory, compares the data to be exchanged with reference data, and determine whether or not to restrict transferring of the data to be exchanged to the other of the CPU 101 and the memory module 103 of the internal memory.

The data interface 113 may include a data buffer module 131 coupled between the CPU 101 and the memory module 103 of the internal memory to buffer the data to be exchanged, which is obtained by the data interface 113. In some embodiments, the data buffer module 131 may include a group of data buffering units, which has multiple bits of data buffering units, e.g. 8 bits, 16 bits, 32 bits, 64 bits or more bits. The bit number of the group of data buffering units depends on the data format used by the CPU 101. In some embodiments, the data buffer module 131 may include a plurality of groups of data buffering units and each group includes multiple bits of data buffering units, e.g. 4 bits, 8 bits or more bits. A sum of the bit number of the plurality of groups of data buffering units corresponds to the data format used by the CPU 101. For example, for a 32-bit CPU 101, the data buffer module 131 may buffer 32 or more bits (some bits may be used as data parity bits) of data. Accordingly, the data buffer module 131 may consist of, for example, eight groups of 4-bit data buffering units or four groups of 8-bit data buffering units, to buffer 32-bit data.

The reference data may be stored in the data interface 113. For example, a reference data storing module 133 may be provided in the data interface 113 to store the reference data. The reference data specifically defines data whose transferring is expected to be restricted, e.g. certain specific instructions. The format and bit number of the reference data may be the same as that of the data to be exchanged so that the reference data can be compared bit-by-bit with the data to be exchanged to determine whether they are identical with each other or not. Accordingly, the data interface 113 may include a data comparing module 135 for comparing the reference data and the data to be exchanged and outputting the comparison result. The apparatus 100 may determine whether or not to restrict further transferring of the data to be exchanged. It should be noted that the reference data may correspond to a plurality of pieces of data so that the reference data may be constructed as a data set. For example, for 32-bit reference data, it is possible that only a portion of its bits are "0" or "1" and the other bits may be arbitrary values. In this case, the data interface 113 may compare the portions of bits with value "0" or "1" of the reference data with those corresponding bits of the data to be exchanged.

In some embodiments, the reference data may be constructed as a "white list", i.e., a list of security data (data with unrestricted or authorized access). In this case, when the data to be exchanged is the same as the reference data, the data interface 113 regards the data is secure and allowed to be accessed. Accordingly, the data interface 113 does not restrict further transferring of the data to be exchanged. In other embodiments, the reference data may be constructed as a "black list", i.e., a list of data with restricted or unauthorized access. In this case, when the data to be exchanged is the same as the reference data, the data interface 113 restricts further transferring of the data to be exchanged.

The data interface 113 may use several ways to restrict further transferring of the data to be exchanged. For example, the data interface 113 may prohibit transferring of the data to be exchanged to the CPU 101 or the memory module 101 of the internal memory. For another example, the data interface 113 may store replacement data in advance and replace the data to be exchanged with the replacement data so as to provide the replacement data to the CPU 101 or the memory module 103 of the internal memory.

In some embodiments, the reference data may be written into the data interface 113 via the controller 111, or via the CPU 101 under the control of the controller 111. Preferably, the reference data is written into the data interface 113 via the controller 111. The controller 111 may have a data access interface 121 through which the reference data, the predefined address space and other information relevant to data access control, e.g. address and data comparing rules, may be written into the controller 111. The data access interface 121 may be an encrypted interface, which may have a module used for user or device authorization such that only authorized user or device could perform data access to the controller 111. In this way, the reference data, the predefined address space and other information can only be modified or configured by the authorized user or device, thereby significantly improving the security level and stability of the system. In applications, the information with respect to the reference data, the predefined address space and so on may be configured and adjusted for various CPUs, especially according to the instruction sets used by the CPUs. For example, the reference data corresponding to certain CPUs provided by Intel may be different from that of the micro processors provided by ARM.

For the memory module 103 of the internal memory, it may have a portion of memory area generally used for storing instructions, and another portion used for storing non-instruction data such as static data. Based on the destination address carried by the received data access command, it can be determined the memory cells of which portion of the memory module 103 is being accessed. In consideration of specific applications such as system security, it can be configured that only a region for storing instructions is accessible. Accordingly, the reference data corresponds to one or more instructions that are allowed to be read from or written into the memory module 103. In other words, the reference data corresponds to a set of system instructions that are allowed to access the internal memory. For example, if the instruction or data to be exchanged and obtained by the data interface 113 is the same as the reference data, then it indicates that the instruction or data is an allowed or authorized instruction. In this case, the data interface 113 may allow the CPU 101 to call or access the authorized instructions. However, if the instruction or data is not an allowed or authorized instruction or data, e.g. a "back-door" instruction unknown to the system, then the CPU 101 is not allowed to call or access the unauthorized instruction and thus can not execute the instruction. In this way, the unknown risk of executing the instruction can be avoided so that the security of the system is improved.

In applications, the controller 111 and the data interface 113 included in the apparatus 100 shown in FIG. 2 may be integrated in a single chip or separated in different chips. In some embodiments, the apparatus 100 and the memory module of the internal memory may be integrated in the internal memory, i.e., integrated on a single circuit board. In some embodiments, the apparatus 100 may be integrated in a buffer device of the internal memory.

Figure 3:
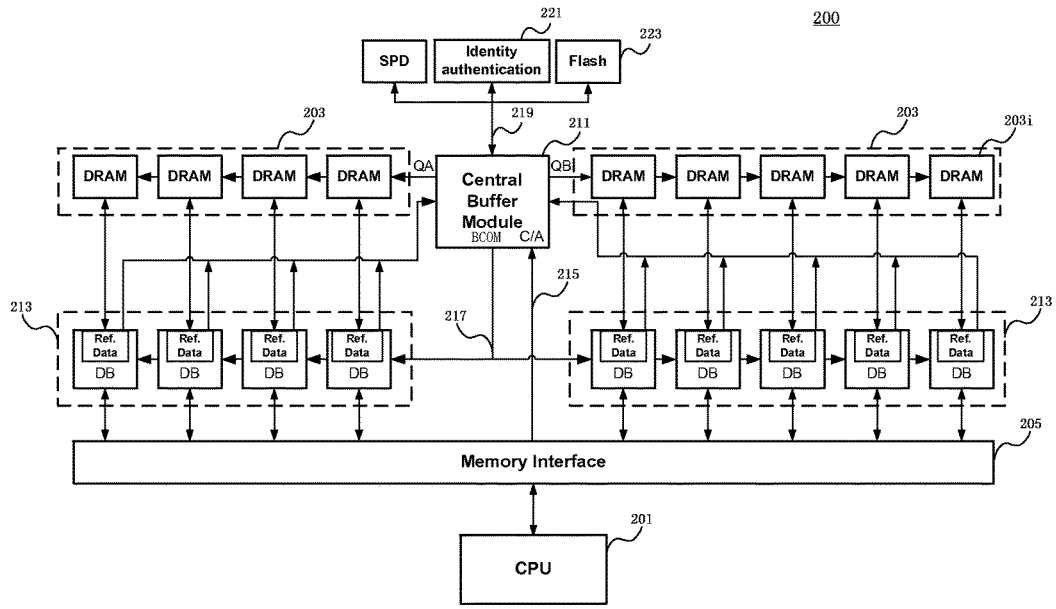
FIG. 3 shows a buffer device 200 according to the application.

FIG. 3 shows a buffer device 200 according to an embodiment of the application. As shown in FIG. 3, the buffer device 200 integrates the apparatus 100 for controlling data access to the internal memory as shown in FIG. 2.

Specifically, the buffer device 200 may be coupled between a CPU 201 and a memory module of an internal memory (e.g. DRAM) to exchange data therebetween. The buffer device 200 may be coupled to the CPU 201 via a memory interface 205. In some embodiments, the buffer device 200 may be used in an internal memory in accordance with the JEDEC DDR SDRAM standard. For example, the buffer device 200 may be used in an internal memory in accordance with the JEDEC LPDDR3 or LPDDR4 standards. In the following embodiments, the buffer device 200 may be described illustratively by referring to an internal memory which is in accordance with the JEDEC DDR4 standard. However, a person skilled in the art may appreciate that it is not intended to limit the application of the buffer device 200.

As shown in FIG. 3, the buffer device 200 includes a central buffer module 211 (which has the functions of the controller 111 shown in FIG. 2) and a data buffer module 213 (which has the functions of the data interface 213 shown in FIG. 2). Specifically, the central buffer module 211 is coupled to the memory interface 205 via a command/address (C/A) channel 215 to receive a command/address signal. The command/address signal is generally sent from the CPU 201. For the memory interface 205 in accordance with the DDR4 standard, the command/address channel 215 may include pins A0-A17, pins BG0-BG1 and/or pins BA0-BA1. The pins BG0-BG1 are used to determine which memory bank group in the memory module 203 is selected to be accessed, e.g. being written into or being read from. The pins BA0-BA1 are used to determine which memory bank in the memory module 203 is selected to be accessed, and the pins A0-A17 are used for addressing and determining which memory cell in a selected memory bank is to be accessed. Moreover, input to the three pins A16 (RAS_n), A15 (CAS_n) and A14 (WE_n) is used for identifying a command input such as a read command, a write command or other predefined control commands. In some embodiments, the central buffer module 211 may be a single control unit, and in some other embodiments, the central buffer module 211 may be integrated into a registering clock driver as a portion thereof.

The central buffer module 211 may detect whether a command/address it receives is within a predefined address space and generate a security access signal when the command/address is within the predefined address space.

Specifically, the memory module 203 may include a plurality of groups of memory cells 203i. Each memory cell of a group of memory cells 203i corresponds to a unique address. Different memory cells may store different data. In many cases, the memory module 203 may be partitioned into different storing regions according to the requirement of an operating system, and each storing region may be designated for storing certain type or types of data. For example, a portion of storing region of the memory module 203 may be used to store instructions, and the other portion may be used to store non-instruction data, e.g., static data. According to the destination address contained in the command/address signal, it can be determined the memory cells of which portion of the memory module 203 is being accessed. In consideration of specific applications such as data security, the operator of a computer system may expect that the access to memory cells in certain regions of the memory module 203 is restricted. Accordingly, an address space corresponding to a storage region may be predefined to which data access is restricted. For example, the predefined address space may correspond to a region for storing instructions in the memory module.

When the central buffer module 211 detects that the destination address contained in the received command/address signal is within the predefined address space, it is determined that the data access may be restricted. Accordingly, the central buffer module 211 may generate a security read/write signal. Specifically, if a command contained in the received command/address signal is a read operation, the central buffer module 211 may generate a security read signal, and if the command contained in the received command/address signal is a write operation, the central buffer module 211 may generate a security write signal. The response of the data buffer module 213 to the security read/write signal is different from that to a normal read/write signal. The response of the data buffer module 213 to the security read/write signal will be described in detail in the following paragraphs. In contrast, when the central buffer module 211 detects that the destination address contained in the received command/address signal is not within the predefined address space, it is determines that the data access is not restricted. In this case, the central buffer module 211 may generate the normal read/write signal to instruct the data buffer module 213 to perform a normal read/write operation on the memory module 203.

The central buffer module 211 may communicate with the data buffer module 213 via a data buffer control bus 217 (BCOM). Specifically, the central buffer module 211 sends the security read/write signal, normal read/write signal or other control signals to the data buffer module 213 via the data buffer control bus 217. In certain buffer device in accordance with the DDR4 standard, e.g. data buffer chips with model numbers M88DDR4DB01 and M88DDR4RCD01 provided by Montage Technology (please refer to the datasheets of these chips for the detailed technical information, the content of which is incorporated into the application by reference in its entirety), the data buffer control bus 217 may be a 4-bit signal line, which is capable of encoding at least eight instructions. Table 1 shows an encoding table of instructions transmitted via the data buffer control bus 217. Herein, codes "1000" and "1001" correspond to the normal write command and the normal read command, respectively, and codes "1110" and "1111" correspond to the security write command (signal) and the security read command (signal), respectively.

TABLE 1

| Commands | BCOM[3:0] |
|---|---|
| Normal write | 1000 |
| Normal read | 1001 |
| MRS write | 1011 |
| BCW write | 1100 |
| BCW read | 1101 |
| Security write | 1110 |
| Security read | 1111 |
| NOP (No operation) | 1010 |

The data buffer module 213 is coupled between the memory interface 205 and the memory module 203 and buffers data therebetween. Specifically, the data buffer module 213 receives data from the CPU 201 via the memory interface 205, buffers the data, and further transfers the buffered data to the memory module 203. On the other hand, the data buffer module 213 obtains data from the memory module 203, buffers the data, and further transfers the buffered data to the memory interface 205 so that the memory interface 205 further provides the buffered data to the CPU 201. A unit data buffered by the data buffer module 213 includes at least all bits of a unit data stored in the memory cell of the memory module 203. Take the embodiment shown in FIG. 3 as an example, each memory cell of the memory module 203 is a 64-bit memory cell. Accordingly, the data buffer module 213 comprises 9 groups of data buffering units and each group of data buffering units has 8 data buffering units to buffer 8-bit data. Thus, the unit data buffered by the data buffer module 213 has 72 bits. Eight of the 72 bits are parity bits and the remaining 64 bits correspond to the 64-bit unit data storable in the memory cell of the memory module 203. In a word, a data buffer module 213 with a distributed structure may include a plurality of groups of data buffering units. Each group of data buffering units is used to buffer a portion of the buffered data, store a portion of reference data, and compare the portion of the buffered data with the portion of the reference data. It will be appreciated that, in some embodiments, the data buffer module 213 may not use a distributed structure, instead, each data buffer module 213 has only a group of data buffering units.

The data buffer module 213 may store the reference data. The number of bits of the reference data should be equal to the number of bits of the data stored in each memory cell of the memory module 203. The reference data represents the data content to be compared or filtered by the buffer device 200. After receiving the security read/write signal, the data buffer module 213 compares the data it buffers with the reference data in response to the security read/write signal, and determines whether or not to restrict exchange of the buffered data between the memory module 203 and the memory interface 205 according to the comparing result between the buffered data and the reference data.

The operation of the data buffer module 213 is further described by taking a security write operation as an example. When receiving the security signal, the data buffer module 213 responds to the security signal to receive data to be written from the memory interface 205. The data is then buffered by the data buffer module 213, and particularly, buffered by the respective groups of data buffering units of the data buffer module 213. Afterwards, the data buffered in each group of data buffering units is compared with the reference data previously stored in the group of data buffering units. If the data buffered in each group of data buffering units is the same as the corresponding reference data, then the content of the buffered data is regarded as being safe and the data exchange operation can move forward. Accordingly, the data buffer module 213 may further transfer the buffered data to the memory module 203 and complete the writing of the data. In contrast, if the data buffered in at least one group of data buffering units is different from the corresponding reference data, it is indicated that the content of the data is not safe and it is desired to restrict the data exchange operation. Accordingly, the data buffer module 213 may prohibit further transferring of the buffered data to the memory module 203. Alternatively, the data buffer module 213 may provide predefined replacement data to the memory module 203 and write the predefined replacement data into the memory module 203 instead of the buffered data.

Similarly, the data buffer module 213 may prohibit further transferring the buffered data to the memory interface 205. Alternatively, the data buffer module 213 may provide the predefined replacement data to the memory interface 205.

Figure 4:
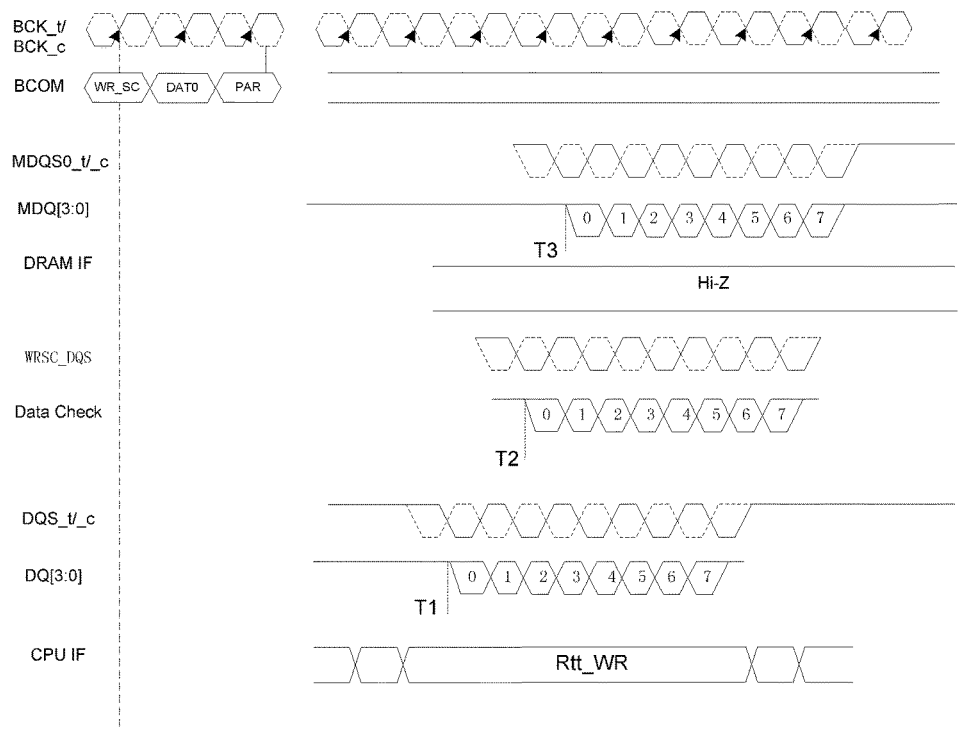
FIG. 4 shows a timing chart of a security write operation executed by a group of data buffering units in FIG. 3.

FIG. 4 shows a timing chart of a security write operation executed by a group of data buffering units in FIG. 3. As shown in FIG. 4, the data buffer control bus BCOM receives a security write signal, and subsequently a signal DAT0 (indicating the selection of memory banks) and a PAR signal (indicating performing parity check on the security write signal and data. After that, at time T1, a group of data buffering units begins to receive data to be written via a port DQ[3:0]. Afterwards, at time T2, the group of data buffering units begins to compare the data to be written with the reference data. If the data to be written is the same as the reference data, then at time T3, the group of data buffering units continues to output the data to be written via a port MDQ[3:0] so as to provide the data to the memory module.

The group of data buffering units may perform the normal write operation in response to the normal write command. The only difference is that data comparison is not performed at T2. Moreover, during the normal write operation, a time interval between data receiving at the port DQ[3:0] and data outputting at the port MDQ[3:0] is the same as that of the security write operation, i.e. equal to T3 minus T1. Therefore, for the memory module, the processing of the normal write operation is the same as that of the security write operation, such that the data buffer module according to embodiments of the application can be fully compatible with the conventional memory modules.

The security read operation can be performed in a similar manner. Specifically, when receiving the security read signal, the data buffer module 213 responds to the security read signal to receive from the memory module 203 data to be read. The data is buffered by the data buffer module 213. The data buffer module 213 then compares the buffered data with the reference data. When the buffered data is different from the reference data, the data buffer module 213 restricts the exchanging of the data, for example, prohibiting transferring the buffered data to the memory interface 205, or providing the replacement data to the memory interface 205 instead. When the buffered data is the same as the reference data, the data buffer module 213 may continue the data exchange operation and provide the buffered data to the memory interface 205.

Figure 5:
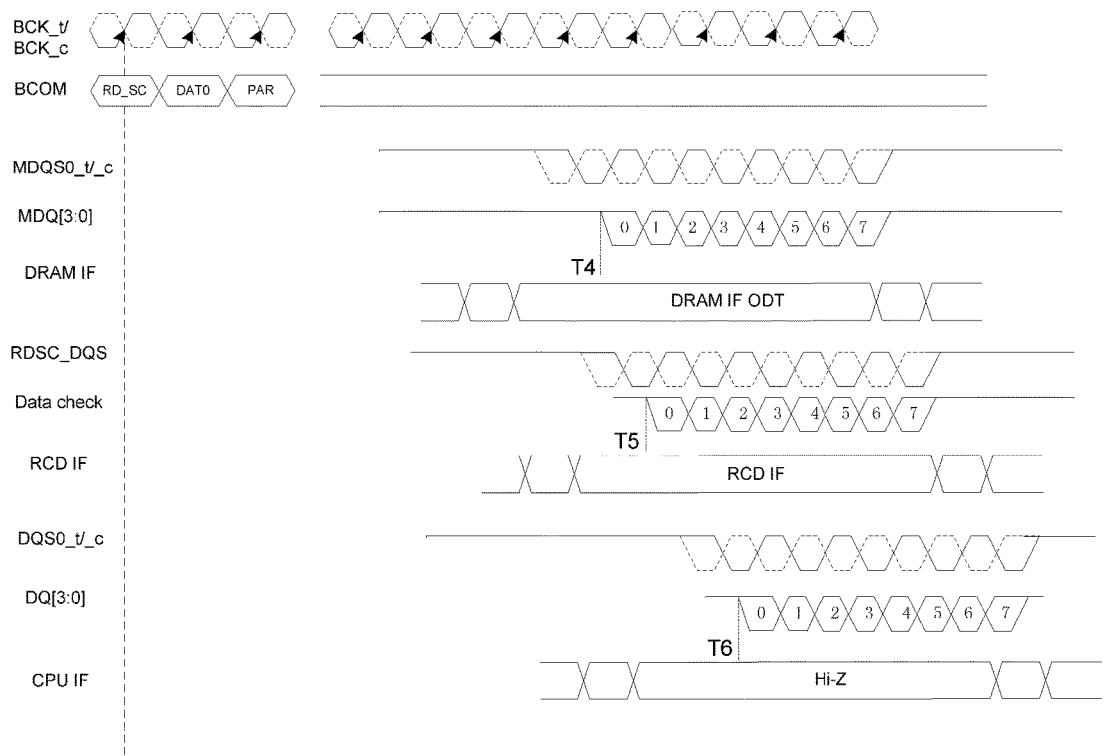
FIG. 5 shows a timing chart of a security read operation executed by a group of data buffering units in FIG. 3.

FIG. 5 shows a timing chart of a security read operation executed by a group of data buffering units in FIG. 3. As shown in FIG. 5, the data buffer control bus BCOM receives a security read signal, and subsequently a signal DAT0 (indicating the selection of memory banks) and a PAR signal (indicating performing the parity check on the security read signal and data). After that, at time T4, a group of data buffering units begins to receive data to be read via the port MDQ[3:0]. Afterwards, at time T5, the group of data buffering units begins to compare the data to be read with the reference data. If the data to be read it has buffered is the same as the reference data, then at time T6, the group of data buffering units continues to output the data to be read via a port DQ[3:0] so as to provide the data to the memory interface.

It should be noted that the aforementioned security read/write operation is implemented with the example of "white list", i.e., the data exchange operation will continue if the buffered data is the same as the reference data. In applications, the security read/write operation may also be implemented in a "black list" manner. Specifically, the data exchange operation is restricted if the buffered data is the same as the reference data and not restricted if the buffered data is not the same as the reference data. Such operation will not be elaborated herein.

In applications, the unauthorized access to the memory module can be prevented by employing the aforementioned security read/write mechanism, thereby effectively solving the data divulgation and system security problems. In some embodiments, the administrator of a computer system, mobile terminal or other electronic devices may determine the specific content of the reference data based on one or more authorized instructions. In other words, the reference data corresponds to a set of instructions allowed to access the memory system. During the security read/write operation, if the buffered instruction or data is the same as the reference data, it is indicated that the buffered instruction or data is an authorized instruction. In this case, the buffer device may allow the CPU to call or access the authorized instruction. However, if the buffered instruction or data is not an authorized instruction, for example, a "back-door" instruction, then the CPU can not call or access the unauthorized instruction, i.e., can not execute the instruction. In this way, the unknown risk of processing the data can be avoided so that the security of the computer system can be improved.

It should be noted that the reference data may be a set of data as the reference data may correspond to a plurality of pieces of data. For example, for the 64-bit reference data, it is possible that only a portion of the data bits thereof are "0" or "1" (e.g., bits 63 to 56 and bits 7 to 0), with the remaining data bits being arbitrary values. In this case, the data buffer module may compare the portions of data bits of the buffered data having the value "0" or "1" with those corresponding data bits of the reference data, and determine whether or not to further perform data exchange based on the comparison result.

Still referring to FIG. 3, the reference data, the predefined address space and the rules for security read/write operations may be written into the central buffer module 211 first, for example, during the initialization of the buffer device 200. In some embodiments, the reference data, the predefined address space and the rules for security read/write operations may be written previously into the central buffer module 211. For example, a programmable read only memory (PROM) may be provided in the central buffer module 211 to store the data. The central buffer module 211 may have a state machine and control logic to execute the rules for security read/write operations. The central buffer module 211 may be provided with a data access interface 219 through which the aforementioned data information can be written. In some embodiments, the data access interface 219 may be physically separate from interfaces accessible by the CPU 201. For example, the data access interface may be a system management access bus (SMA Bus). The SMA bus is generally coupled with a serial presence detect (SPD) device. Preferably, the data access interface 219 may be an encrypted interface. For example, an identity authentication module 221 may be provided to detect whether a device or user accessing the central buffer module 211 via the data access interface is a predefined authorized device or user. Only when the accessing device or user is determined as the authorized device or user, the data access interface 219 may allow the authorized device or user to access the data stored in the central buffer module. In this way, the security of the reference data, the predefined address space and the rules for security read/write operations may be significantly improved. In some embodiments, the reference data, the predefined address space and the rules of security read/write operations may be written previously into a memory 223 coupled with the data access interface 219. The memory 223 may be a flash memory or any other non-volatile memories. Moreover, the memory 223 may be accessible by external devices such that the administrator of the system can modify or update the information regarding the reference data, the predefined address space and the rules for security read/write operations.

In some embodiments, a switching mechanism may be provided in the buffer device 200. For example, before the initialization of the central buffer module 211, a command may be sent to the central buffer module 211 via the data access interface 219 to instruct whether or not to execute implement the security read/write mechanism. Moreover, a reset mechanism may also be provided in the buffer device 200. For example, after the initialization of the central buffer module 211, a command may be sent to the central buffer module 211 via the data access interface 219 to instruct re-initialization. The central buffer module 211 may obtain information such as updated reference data from the memory 223 to update or reset the security read/write mechanism.

In some embodiments, the buffer device 200 may provide multiple rules for security read/write operation and correspondingly multiple sets of reference data and predefined address space. Each of the rules corresponds to a type of CPU architecture and the corresponding reference data corresponds to an instruction set used by the type of CPU architecture. The buffer device 200 may detect the architecture, model or feature of the CPU 201 coupled therewith, and initialize the corresponding rule, the predefined address space or reference data of security read/write operation according to the detection result. In this way, the buffer device 200 can automatically cooperate with different CPUs to perform the security read/write operations, which makes the application more flexible.

The reference data may be further transferred from the central buffer module 211 to the data buffer module 213 and stored therein, for example, stored in a register of the data buffer module 213. In some embodiments, the reference data may be written into the data buffer module 213 via a data buffer control bus. For example, the buffer device 200 may work in a per DRAM addressability (PDA) mode to control writing the reference data into each group of data buffer units of the data buffer module 213.

In some embodiments, the buffer device 200 may include a logger for logging a history of the security read/write operations of the buffer device 200. The logger may be integrated within the memory 223. For example, the logger may be used to log, within a time period, the number of occurrences of security read/write operations and the addresses of the memory module 203 accessed by the CPU 201 that trigger the security read/write operation. The logger may be coupled to the central buffer module 211 via, for example, a data access interface 219, and exchange data with the central buffer module 211. An authorized external device or the central buffer module 211 may also access the logger to obtain the history of read/write operations stored therein. In some embodiments, the logger may also be provided in the central buffer module 211.

It should be noted that, in the embodiments of the application, the buffer device may include one or both of the security read mechanism and the security write mechanism. For example, for a buffer device that only includes the security read mechanism, if the command contained in the received command/address signal is the write command, the buffer device may not detect whether the command/address signal is within the predefined address space and may not perform subsequent security read/write operations. Similarly, for the buffer device that only includes the security write mechanism, if the command contained in the received command/address signal is the read command, the buffer device may not detect whether the command/address signal is within the predefined address space and may not perform subsequent security read/write operations.

Figure 6:
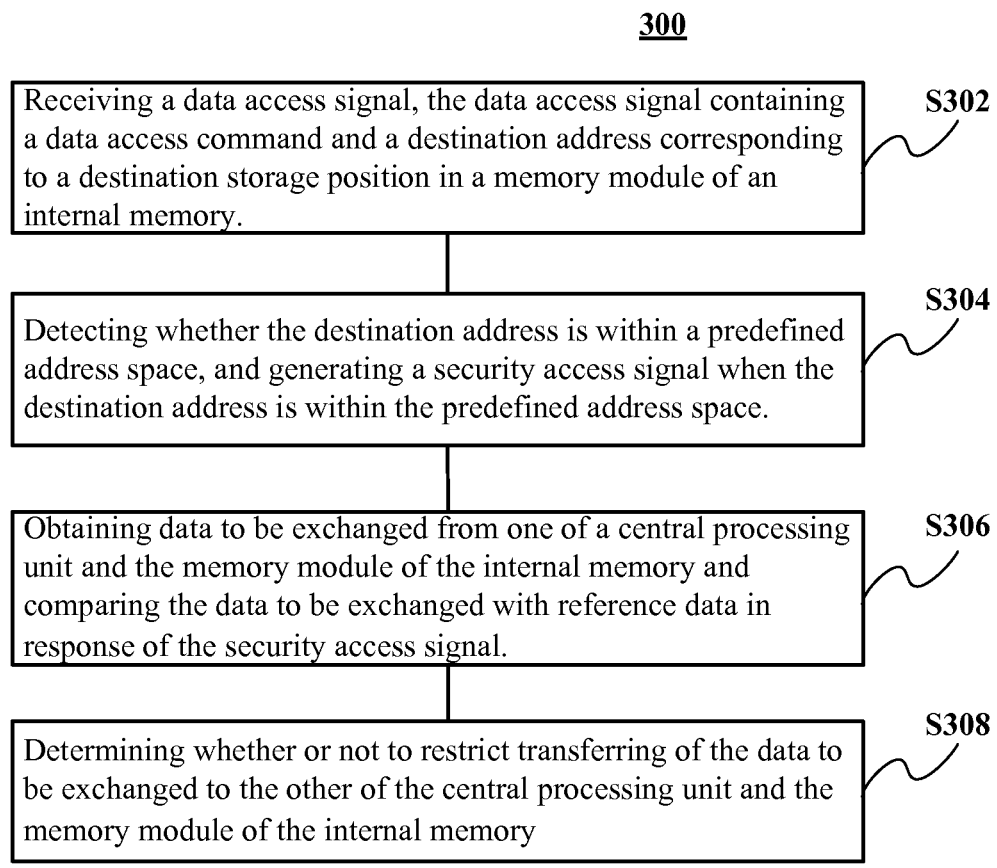
FIG. 6 shows a method 300 for controlling data access to an internal memory according to an embodiment of the application.

FIG. 6 shows a method 300 for controlling data access to an internal memory according to an embodiment of the application. As shown in FIG. 6, the method 300 for controlling data access may be executed, for example, by the apparatus 100 shown in FIG. 1 or the buffer device 200 shown in FIG. 3.

As shown in FIG. 6, in step S302, a data access signal is received. The data access signal contains a data access command and a destination address corresponding to a destination storage location in a memory module of an internal memory. Then, in step S304, it is detected whether the destination address is within a predefined address space, and a security access signal is generated when the destination address is within the predefined address space. After that, in step S306, in response to the security access signal, data to be exchanged is obtained from one of a CPU and the memory module of the internal memory, and the data to be exchanged is further compared with reference data. Next, in step S308, it is determined whether or not to restrict transferring of the data to be exchanged to the other of the CPU and the memory module of the internal memory.

In some embodiments, the step of determining whether or not to restrict transferring of the data to be exchanged to the other of the CPU and the memory module of the internal memory comprises: restricting transferring of the data to be exchanged to the other of the CPU and the memory module of the internal memory when the data to be exchanged is different from the reference data; and not restricting transferring of the data to be exchanged when the data to be exchanged is the same as the reference data.

In some embodiments, the step of restricting transferring of the data to be exchanged comprises: not providing the data to be exchanged to the other of the CPU and the memory module of the internal memory; or replacing the data to be exchanged with replacement data and provide the replacement data to the other of the CPU and the memory module of the internal memory.

In some embodiments, the method further comprises: generating a normal access signal when the destination address is not within the predefined address space; and not comparing the data to be exchanged with the reference data and performing a normal data access operation in response to the normal access signal.

In some embodiments, the predefined address space corresponds to an area for storing instructions in the memory module.

It should be noted that although several modules or sub-modules of the apparatus for controlling data exchange in internal memories and the buffer device have been described in the previous paragraphs, such division is exemplary and not mandatory. Practically, according to the embodiments of the present application, the functions and features of two or more modules described above may be embodied in one module. On the other hand, the function and feature of any one module described above may be embodied in two or more modules.

Those skilled in the art may understand and implement other variations to the disclosed embodiments from a study of the drawings, the disclosure, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A buffer device, comprising:
   a central buffer module coupled to a memory interface to receive a command/address signal via a command/address channel, the central buffer module being configured to detect whether a destination address of the received command/address signal is within a predefined address space, and generate a security read/write signal when the command/address signal is within the predefined address space; and
   a data buffer module coupled between the memory interface and a memory module to buffer data therebetween, the data buffer module being configured to store reference data, compare the buffered data with the reference data in response to the security read/write signal, and determine whether or not to restrict exchange of the buffered data between the memory module and the memory interface;
   wherein the central buffer module is integrated in a registering clock driver and the registering clock driver is configured to provide the security read/write signal to the data buffer module via a data buffer control bus.

2. The buffer device of claim 1, wherein the central buffer module is further configured to store the reference data and control transferring of the reference data to the data buffer module.

3. The buffer device of claim 1, wherein the data buffer comprises at least one group of data buffering units, each group of data buffering units being configured to buffer a portion of the buffered data and a portion of the reference data, and compare the portion of the buffered data with the portion of the reference data.

4. The buffer device of claim 1, wherein the data buffer module is configured to restrict the exchange of the buffered data between the memory module and the memory interface when the buffered data is different from the reference data, and not to restrict the exchange of the buffered data between the memory module and the memory interface when the buffered data is the same as the reference data.

5. The buffer device of claim 4, wherein the data buffer module restricting the exchange of the buffered data between the memory module and the memory interface when the buffered data is different from the reference data comprises:
   the data buffer module being configured not to provide the buffered data to the memory interface or the memory module; or
   the data buffer module being configured to replace the buffered data with replacement data and provide the replacement data to the memory interface or the memory module.

6. The buffer device of claim 1, wherein the central buffer module is configured to generate a normal read/write signal when the destination address of the command/address signal is not within the predefined address space; and the data buffer module is configured not to compare the buffered data with the reference data and to perform a normal read/write operation in response to the normal read/write signal.

7. The buffer device of claim 1, wherein the predefined address space corresponds to a region for storing instructions in the memory module.

8. The buffer device of claim 1, wherein the central buffer module comprises a data access interface through which the reference data and/or the predefined address space is written into the central buffer module.

9. The buffer device of claim 8, wherein the data access interface is an encrypted interface which is configured to allow only an authorized user or device to access the data in the central buffer module.

10. The buffer device of claim 1, wherein the memory module and the memory interface is in accordance with the JEDEC DDR SDRAM standard.

11. The buffer device of claim 1, wherein the registering clock driver is further configured to write the reference data into the data buffer module via the data buffer control bus.

12. The buffer device of claim 1, wherein the buffer device further comprises a logger coupled to the central buffer module and for obtaining and logging a history of the security read/write operations to the buffer device.

13. The buffer device of claim 1, wherein the central buffer module and the data buffer module are integrated in a single chip or separated in different chips.

14. The buffer device of claim 1, wherein the buffer device and the memory module are integrated on a single board.

15. The buffer device of claim 1, wherein the memory module comprises a volatile memory, a non-volatile memory or a combination thereof.

16. An internal memory comprising the buffer device of claim 1.

17. A computer system comprising the internal memory of claim 16.

18. A mobile terminal comprising the internal memory of claim 16.

19. An apparatus for controlling data access to an internal memory, comprising:
   a controller coupled to a central processing unit to receive a data access signal; the data access signal containing a data access command and a destination address corresponding to a destination storage location in a memory module of the internal memory; the controller being configured to detect whether the destination address is within a predefined address space and generate a security access signal when the destination address is within the predefined address space; and
   a data interface coupled between the central processing unit and the memory module of the internal memory and coupled to the controller to exchange data between the central processing unit and the memory module of the internal memory under the control of the controller; the data interface being configured, in response to the security access signal, to obtain data to be exchanged from one of the central processing unit and the memory module of the internal memory, compare the data to be exchanged with reference data, and determine whether or not to restrict transferring of the data to be exchanged to the other of the central processing unit and the memory module of the internal memory;

wherein the controller is integrated in a registering clock driver and the registering clock driver is configured to provide the security access signal to the data interface via a data buffer control bus.

20. The apparatus of claim 19, wherein the data interface comprises:
   a reference data storage module for storing the reference data; and
   a data buffer module coupled between the central processing unit and the memory module of the internal memory and for buffering the data to be exchanged; and
   a data comparison module for comparing the reference data with the data to be exchanged.

21. The apparatus of claim 19, wherein the data interface is configured to restrict transferring of the data to be exchanged to the other of the central processing unit and the memory module of the internal memory when the data to be exchanged is different from the reference data, and not to restrict transferring of the data to be exchanged when the data to be exchanged is the same as the reference data.

22. The apparatus of claim 21, wherein the data interface restricting transferring of the data to be exchanged comprises:
   the data interface being configured not to provide the data to be exchanged to the other of the central processing unit and the memory module of the internal memory; or
   the data interface being configured to replace the data to be exchanged with replacement data and provide the replacement data to the other of the central processing unit and the memory module of the internal memory.

23. The apparatus of claim 19, wherein the controller is configured to generate a normal access signal when the destination address is not within the predefined address space; and the data interface is configured not to compare the data to be exchanged with the reference data and to perform a normal access operation in response to the normal access signal.

24. The apparatus of claim 19, wherein the predefined address space corresponds to a region for storing instructions in the memory module.

25. The apparatus of claim 19, wherein the controller comprises a data access interface through which the reference data and/or the predefined address space are written into the central buffer module.

26. The apparatus of claim 19, wherein the data access interface is an encrypted interface which is configured to allow only an authorized user or device to access the data in the controller.

27. The apparatus of claim 19, wherein the internal memory is in accordance with the JEDEC DDR SDRAM standard.

28. The apparatus of claim 19, wherein the apparatus further comprises a logger coupled to the controller for obtaining and logging a history of the security access operations to the apparatus.

29. The apparatus of claim 19, wherein the controller and the data interface are integrated in a single chip or separated in different chips.

30. The apparatus of claim 19, wherein the apparatus and the memory module of the internal memory are integrated on a single board.

31. The apparatus of claim 19, wherein the memory module of the internal memory comprises a volatile memory, a non-volatile memory or a combination thereof.

32. An internal memory comprising the apparatus for controlling data access of claim 19.

33. A computer system comprising the internal memory of claim 32.

34. A mobile terminal comprising the internal memory of claim 32.

35. An method for controlling data access to an internal memory, comprising:
   receiving via a central buffer module a data access signal; the data access signal containing a data access command and a destination address corresponding to a destination storage location in a memory module of the internal memory;
   detecting via the central buffer module whether the destination address is within a predefined address space, and generating via the central buffer module a security access signal when the destination address is within the predefined address space; and
   obtaining via a data buffer module in communication with the central buffer module data to be exchanged from one of a central processing unit and the memory module of the internal memory and comparing via the data buffer module the data to be exchanged with reference data in response of the security access signal, wherein the reference data is stored within the data buffer module; and
   determining via the data buffer module whether or not to restrict transferring of the data to be exchanged to the other of the central processing unit and the memory module of the internal memory;
   wherein the central buffer module is integrated in a registering clock driver and the registering clock driver is configured to provide the security access signal to the data buffer module via a data buffer control bus.

36. The method of claim 35, wherein determining via the data buffer module whether or not to restrict transferring of the data to be exchanged to the other of the central processing unit and the memory module of the internal memory comprises:
   restricting via the data buffer module transferring of the data to be exchanged to the other of the central processing unit and the memory module of the internal memory when the data to be exchanged is different from the reference data; and
   not restricting via the data buffer module transferring of the data to be exchanged when the data to be exchanged is the same as the reference data.

37. The method of claim 36, wherein restricting via the data buffer module transferring of the data to be exchanged comprises:
   not providing via the data buffer module the data to be exchanged to the other of the central processing unit and the memory module of the internal memory; or
   replacing via the data buffer module the data to be exchanged with replacement data and provide the replacement data to the other of the central processing unit and the memory module of the internal memory.

38. The method of claim 35, wherein the method further comprises:

generating via the central buffer module a normal access signal when the destination address is not within the predefined address space; and not comparing via the data buffer module the data to be exchanged with the reference data and performing via the data buffer module a normal data access operation in response to the normal access signal.

39. The method of claim 35, wherein the predefined address space corresponds to an area for storing instructions in the memory module.

* * * * *